United States Patent [19]

Vick

[11] 4,000,878
[45] Jan. 4, 1977

[54] QUIETING MEANS FOR A FLUID FLOW DEVICE

[75] Inventor: Ralph L. Vick, Granada Hills, Calif.

[73] Assignee: The Bendix Corporation, North Hollywood, Calif.

[22] Filed: July 29, 1975

[21] Appl. No.: 600,021

Related U.S. Application Data

[60] Division of Ser. No. 470,251, May 15, 1974, which is a continuation of Ser. No. 293,956, Oct. 2, 1972, abandoned.

[52] U.S. Cl. .............................. 251/127; 137/501; 137/625.3
[51] Int. Cl.² ................................ F16K 47/08
[58] Field of Search .......... 137/625.3, 501; 138/40, 138/42, 43; 251/127

[56] References Cited

UNITED STATES PATENTS

| 1,790,854 | 2/1931 | Defrance et al. ............... 138/40 X |
| 3,856,049 | 12/1974 | Scull ........................... 138/42 |

Primary Examiner—Alan Cohan
Assistant Examiner—Gerald A. Michalsky
Attorney, Agent, or Firm—Robert C. Smith; William F. Thornton

[57] ABSTRACT

Quieting means for a fluid flow control device is shown in connection with a typical spool type throttling valve. The quieting means consists of a stack of washer-like members or disks which cooperate to define a large number of finely divided flow paths across the stack of disks. To provide a configuration which is very economical of space, the disks are arranged such that the flow path turns back and forth through different planes. Groups of flow paths are defined by a number of groups of three perforated disks confined between two imperforate disks. Two perforated disks having patterns of slots are positioned on opposite sides of a similar disk having a pattern of small orifices. By proper juxtaposition of the three disks, a circuitous flow pattern is established from a first chamber defined by a first slot and its side walls, axially through a small orifice to a second such chamber, substantially radially through said second chamber and axially in the opposite direction to another such chamber and continuing in this manner across the stack of disks. The dimensions of the slots and orifices are chosen such that the velocity of flow through any orifice does not exceed a desired limit.

9 Claims, 14 Drawing Figures

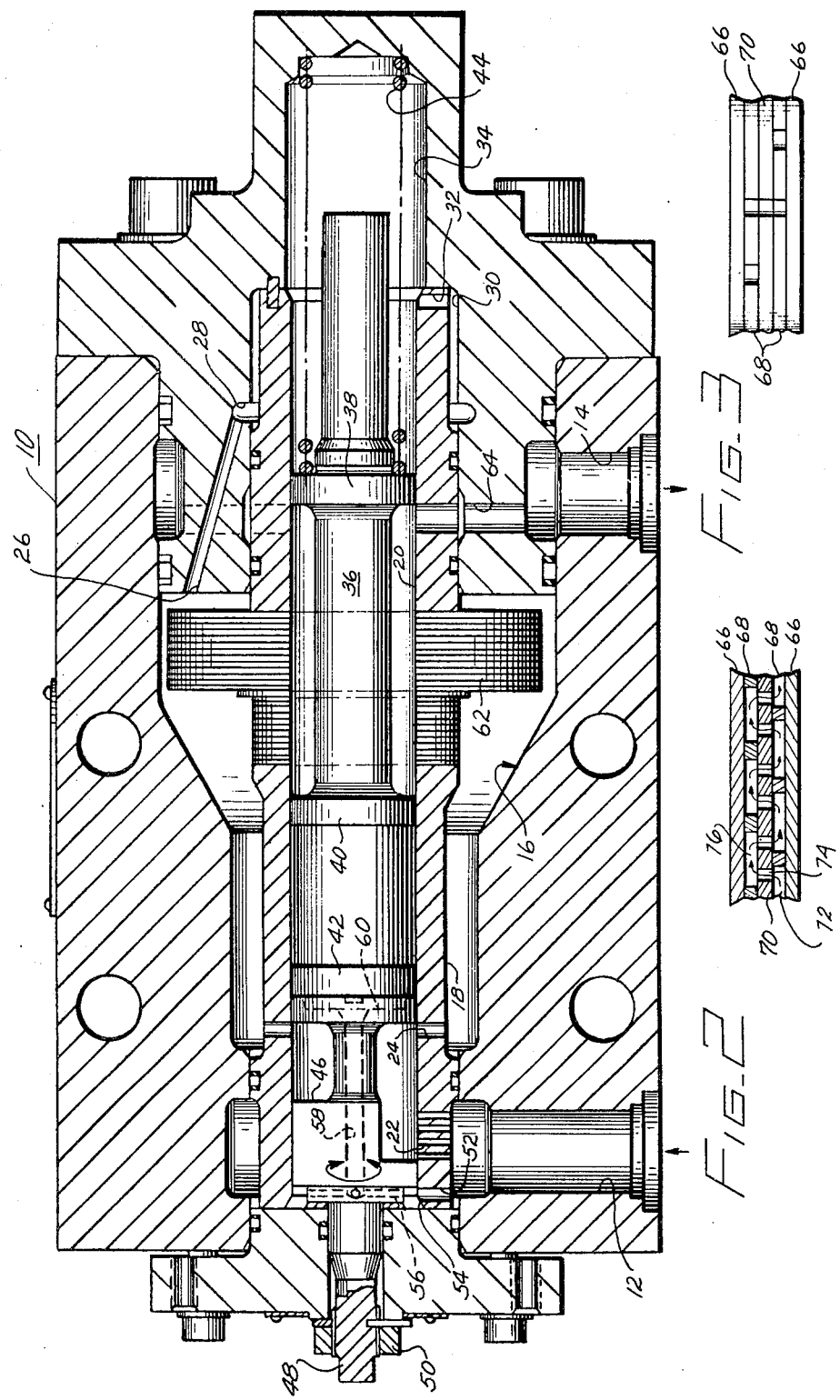

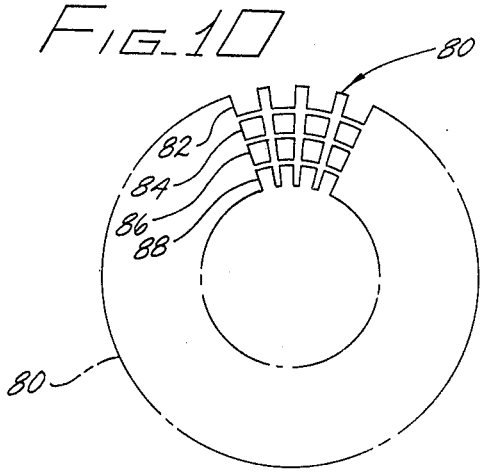
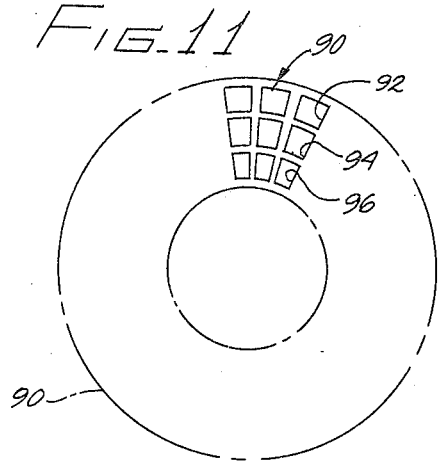
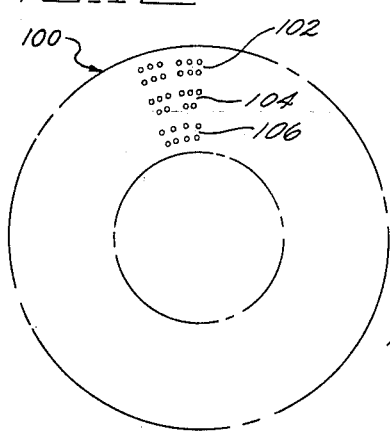
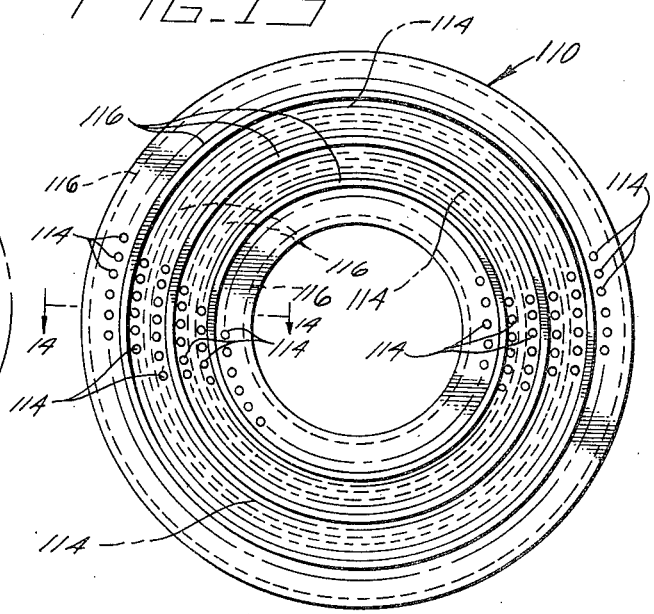
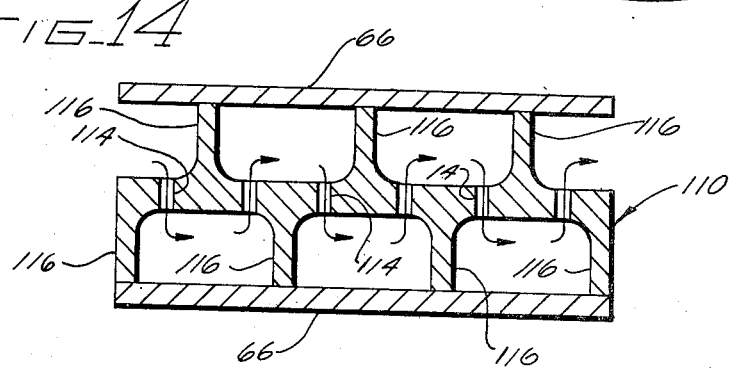

QUIETING MEANS FOR A FLUID FLOW DEVICE

This is a division of application Ser. No. 470,251 filed May 15, 1974, which is a continuation of application Ser. No. 293,956 filed Oct. 2, 1972, now abandoned.

BACKGROUND OF THE INVENTION

In a wide variety of practical applications there is a need for structures to vary the fluid-flow rate of flowing fluids without the production of noise and vibration. The term "throttling" is generally applied to the function of altering or adjusting fluid flow throughout a range of flow rates. The various structures by which the function is performed are generally called "throttling valves" to distinguish them from structures whose function is to open and close a flow path as a step function. To the extent that on-off valves are not opened and closed instantaneously, so that throttling noise and vibration may be produced therein at the time of opening or closure, the invention described herein is applicable to such valves as well, and they are included in the term "throttling valve".

A typical control valve for handling the flowing of high pressure fluids employs a structure in which the cross-sectional area of the flow path is altered. This type of structure generally produces substantial noise and vibration and is quite subject to damage from cavitation. However, the structures employed in this arrangement are, as a class, least expensive and most conveniently employed. Of particular interest herein is a structure for quieting of spool valves. In general, the noise, vibration and cavitation generated in orificial valves is an incident to the Venturi effect which attends movement of the fluid through the orificial opening. When the orifice has reduced cross-sectional area, or is throttled, fluid velocity is reduced, and its pressure energy is reduced. The energy difference results in turbulence following the orifice where it is transformed into increased internal temperature of fluid and into acoustic energy in the form of noise transmitted through the fluid and in vibration in the surrounding structure, some of which occurs at audible frequency. In extreme cases, the turbulence results in localized pressure reductions downstream from the orificial restriction sufficient to form vapor spaces or pockets. The vapor in these spaces is returned to liquid as the vapor bubble is imploded by the pressure of the medium surrounding the bubble. This phenomenon is called cavitation and results in noise and occasional erosion of adjacent surfaces of the valve structure. It will be appreciated that there are many applications for which it is desired to substantially reduce both the noise and the effects of cavitation in operation of spool valves. A similar useful effect is produced when the resulting noise is of a magnitude and frequency such that it is not readily transmitted to or through the surrounding structure.

There have been many structures devised in an attempt to deal with the noise, vibration and possible cavitation resulting from operation of valves in high pressure systems. Most of these have involved some form of baffling means which operate in one way or another to divide the flow into finely divided streams. One such arrangement involves creating a baffle consisting of a number of successive layers of fine screen-like material which are held tightly together and preferably brazed since it is necessary to avoid mechanical vibration of the parts. Another type of structure which has been proposed and used to some extent includes baffles or sleeves of sintered metal. Both of these latter arrangements have proven unsuccessful for severe applications in that the amount of quieting provided is insufficient and that, in the case of the sintered elements, there is some inconsistency in structure which makes the results somewhat unpredictable. Another type of structure which has been used consists of a stack of disks having tortuous passageways etched on adjacent surfaces to thereby provide a large number of discrete flow paths with many turns as a means of frictionally inhibiting the flow across the stack. This arrangement can provide good quieting, but since it relies essentially on frictional losses, performance is quite susceptible to viscosity changes which are an inherent result of temperature changes.

DESCRIPTION OF THE DRAWINGS

FIG. 1 is a cross-sectional view of a typical spool-type valve using my invention;

FIG. 2 is a partial sectional view through a stack of quieting elements as used in FIG. 1 showing the flow path therethrough;

FIG. 3 is an edge view, partly broken away, of a stack of quieting elements such as those of FIG. 2, showing the detent means used to assure radial alignment of the elements;

FIG. 10 is a plan view of one of a first group of quieting elements of an additional embodiment having a somewhat different orifice arrangement;

FIG. 11 is a plan view of one of a second group of elements which cooperate with the elements of FIG. 10; and FIG. 12 is a plan view of another of the second group of elements.

FIGS. 13 and 14 are views of an additional embodiment of the invention.

DESCRIPTION OF THE PREFERRED EMBODIMENT

Figure 4:
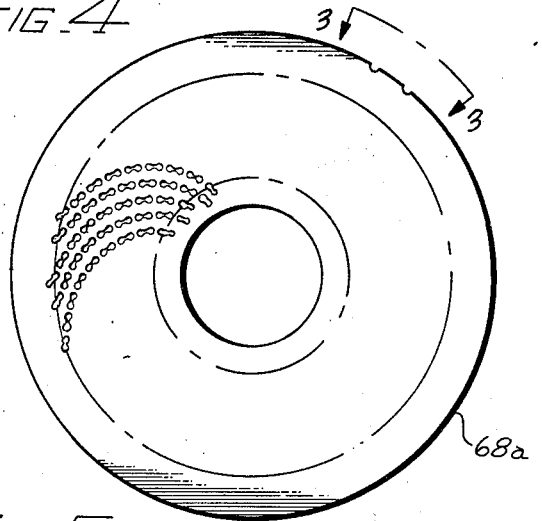
FIG. 4 is a plan view of one of a first group of quieting elements showing the pattern of elongated passages therethrough prior to final assembly and trimming.

A flow control valve is shown generally at numeral 10 whose purpose is to provide a desired quantity of flow irrespective of pressure changes across it. Fluid from a source, not shown, is supplied to an inlet passage 12, and flow from the valve member 10 is provided to an external utilization device, also not shown, through an outlet conduit 14. Fixed within a large internal chamber 16 of valve 10 is a stationary, generally cylindrical member 18 having an axial bore 20 therethrough. Drilled through the side wall of member 18 in communication with inlet passage 12 are a number of small radially and axially arranged orifices 22 which communicate with bore 20 and through a passageway 24 with chamber 16. Fluid in chamber 16 is communicated through a passageway 26 to an annulus 28, chamber 30 and a passageway 32 to a chamber 34 defined partially of the bore 20. Reciprocable within bore 20 is a spool valve 36 which includes a spool member 38, another spool member 40, and a spool member 42. Abutting against spool member 38 is a spring 44 which urges spool 36 toward the left.

Abutting against the spool member 42 is a control valve member 46 which is also positioned within bore 20 which is manually movable in a radial manner with rotation of the externally exposed shaft 48 which is held in a desired position by means of a lock nut 50. Fluid pressure in inlet 12 is communicated through a passageway 52 into an annulus 54 from whence it communicates with a plurality of radial passageways 56 connected to an axial passageway 58 and from thence to a chamber 60. Fluid pressure in chamber 60 is exerted against the end of spool 42 in opposition to the force of spring 44.

Rotation of the manually adjustable shaft 48 which, in turn, rotates member 46 causes member 46, which is cut away over a portion of its circumference, to successively cover or uncover a desired number of the orifices 22. When member 46 has been rotated to the desired position to cover the requisite number of orifices 22, lock nut 50 is tightened, thereby maintaining member 46 in the desired radial position.

Fluid flowing through the valve 10 passes into inlet conduit 12, across orifices 22, through passage 24 into chamber 16. From chamber 16 it flows across a large number of finely divided passageways represented by the washer-like elements shown at numeral 62 and from thence to the chamber formed within bore 20 between spool elements 38 and 40. This chamber communicates with outlet passage 14 through a conduit 64.

The orifices 22 interpose a controlled pressure drop and essentially the only substantial pressure drop between the passage 12 and chamber 34. Since passageways 52, 56 and 58 simply communicate with chamber 60 and no flow rate occurs through these passages except during transient movement of spool 36, fluid at what is essentially inlet pressure is provided to the chamber 60, and this fluid pressure acts to urge spool member 36 toward the right against the spring 44. Since the fluid pressures on the opposite ends of spool member 38 act on essentially equal areas, it will be appreciated that spool 36 will tend to seek a position where the fluid pressure differential thereacross wil be balanced by the force of spring 44.

As shown, the valve member 36 is in its maximum leftward position. In the case of a substantial pressure drop downstream of outlet port 14, this lowered pressure will be communicated into the chamber 34, and inlet pressure in chamber 60 will cause the spool member 36 to move toward the right. As it moves toward the right, it will cause spool 40 to successively cover more and more of the finely divided orifices discharging fluid from the disks 62 into the chamber between spools 40 and 38. Since the valve 10 is designed to operate with very high pressure differentials (approximately 4000 psi), any significant throttling action across it will result in the creation of noise and vibration, absent the use of quieting means such as disks 62. It has been found that the use of such quieting means will reduce the structural borne noise associated with valves of this type from over 130 db at frequencies up to 10 KH$_z$ to less than 80 db within this frequency range.

It will be appreciated that the valve described above is only one of many types which might be shown as exemplary of an application for applicant's quieting means. This quieting structure would also be applicable for use in connection with servo valves of the type shown in the patent to D. V. Healy, No. 3,095,002, and particularly in connection with the second stage of this or any similar type of electrohydraulically driven servo valve.

FIG. 2 is an enlarged sectional drawing showing partial flow paths through the disks 62. This bank of disks 62 consists of successive groups of elements arranged as shown in FIG. 2 to provide a circuitous path across the elements. Positioned between each pair of solid disks 66 are a pair of disks 68 having elongated openings and positioned therebetween a single disk 70 having orifices of relatively small diameter. The fluid flow is confined between the solid disks 66 and proceeds from a chamber 72 formed by an opening in disk 68 cooperating with a solid disk 66 and the disk 70. The flow then proceeds from this chamber across a small orifice 74 of disk 70 into a similar larger chamber 76 in the opposite disk 68. In this manner fluid flows from a chamber through an orifice to a similar chamber and then reverses direction across the next small orifice into another larger chamber and follows this pattern from outside to inside of the stack of disks. In the arrangement shown in FIG. 2, there is very little restriction or frictional resistance in the elongated chambers 72, 76, etc., and essentially all of the pressure drop occurs across the orifices in disk 70.

FIG. 3 is a view of an outside edge of some of the disks shown in FIG. 2, showing the manner in which the disks 68 and 70, in particular, are notched to provide indexing means to assure that the orientation of these members relative to each other is such that flow will be as described. Other suitable indexing arrangements could be used, but this has been found satisfactory for production.

Figure 5:
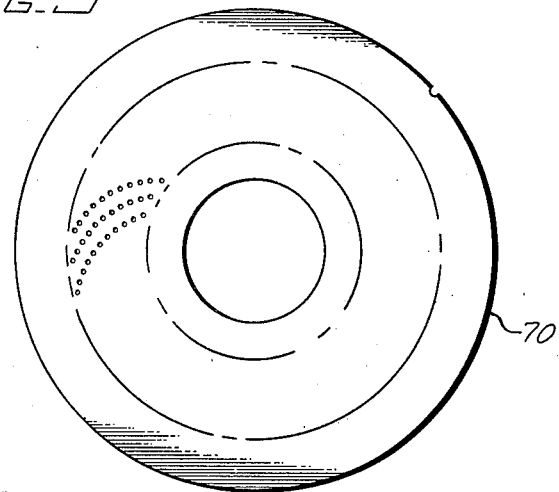
FIG. 5 is a plan view of one of a second group of quieting elements showing the pattern of orifices therethrough prior to final assembly and trimming.
Figure 6:
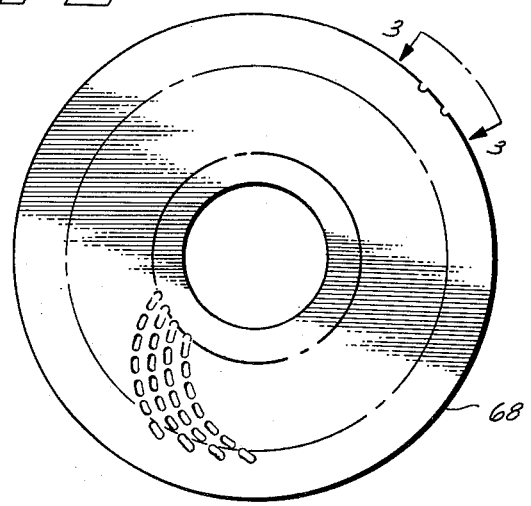
FIG. 6 is a plan view of one of a group of quieting elements similar to those of FIG. 4, but using passageways of a different shape from those of FIG. 4.

FIGS. 4 through 9 are plan views of the several disks 66, 68, 68a and 70 at different stages of production. It will be appreciated that disks 66 are plain disks like that shown in FIG. 9 with a large central opening and are formed to the desired dimensions. FIG. 4 shows a plan view of a disk similar to that shown at numeral 68 in FIGS. 2 and 3, but since the perforations are somewhat different this disk has been given numeral 68a. A series of dumbbell-shaped perforations are cut through the disk 68a and extend from near the outside edge to near the inside edge. FIG. 5 is a similar plan view of disk 70 which includes a plurality of small orifices arranged to be positioned between the chambers formed in the disks 68 or 68a, as described. FIG. 6 is a plan view of a disk 68 similar to that of FIG. 4 except that the elongated perforations have straight sides. It will be appreciated that the rows of perforations extend for the entire circumference of the disk rather than for a small arc as shown. FIGS. 4, 5 and 6 show the indexing notches at their edges as described in connection with FIG. 3. When disks 68 or 68a are assembled in a stack, indexing the individual disks one notch apart results in the continuous and circuitous flow pattern shown in FIG. 3.

Figure 7:
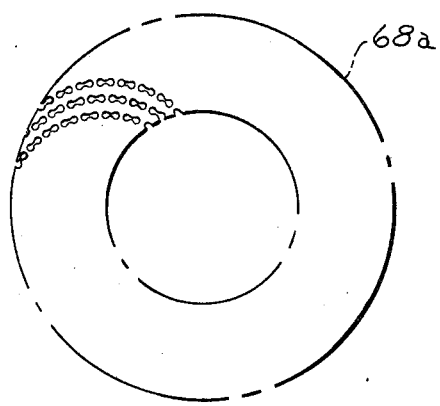
FIG. 7 is a plan view of the element of FIG. 4 after trimming.
Figure 8:
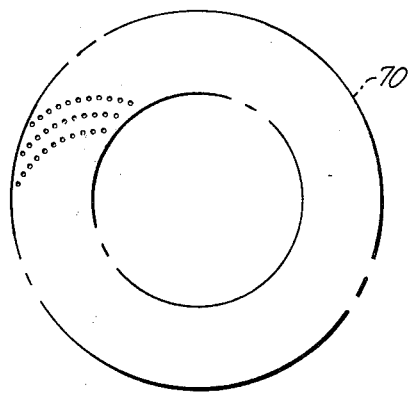
FIG. 8 is a plan view of the element of FIG. 5 after trimming.
Figure 9:
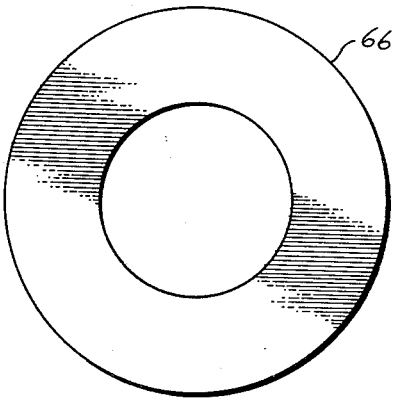
FIG. 9 is a plan view of an unperforated element after trimming.

When the stacks have been assembled to the length desired, the disks may be fastened together in any desirable manner, as by brazing, etc., and they are then trimmed to dimensions as shown in FIGS. 7, 8 and 9 with the outside circumference being cut down and the inside bore enlarged until both ends of the elongated ports of elements 68 and 68a are exposed. Once this is done, it is possible for the flow to proceed across the stack as shown in FIG. 2.

FIGS. 10, 11 and 12 show a modified form of disk pattern wherein the flow may proceed through a number of orifices in parallel. The disk 80 has a number of openings 82, 84, 86 and 88 which are of such area that they serve to define the size of chambers which overlie a group of several orifices. Disk 92 includes openings 92, 94 and 96 which are radially displaced relative to the openings in disk 80. Disk 100 includes a number of groups of orifices which are spaced such that when disks 80, 90 and 100 are stacked, a flow pattern essentially identical to that shown in FIG. 2 results, except that additional orifices are in parallel with the one shown for conveying fluid from one chamber to the next. Thus, flow entering opening 82 will flow through the outside row of orifice group 102 into a chamber defined by opening 92, through the inside row of orifice group 102 to a chamber defined by opening 84, thence through the outside row of orifice group 104, etc.

A still additional embodiment is represented by the disk 110 shown in FIG. 13. A number of upstanding coaxially arranged ridges 116 extending from the opposite sides of disk 110 cooperate with blank disks 66 to define annular chambers which communicate with each other through orifices 114. FIG. 14 is a sectional view of the embodiment using disk 110 with disks 66 showing a flow pattern similar to that of FIG. 2 except that the chambers are annular.

In all the modifications shown, the theory of operation is essentially the same. It has been observed that the noise caused by flow across an orifice is a function of Reynold's number, and one of the factors of Reynold's number which has caused problems with similar devices is fluid viscosity which may change a substantial amount, rendering noise performance variable. With the design described above where flow is from a chamber of comparatively large volume across a small orifice to another such large chamber, the velocities across the orifices are controlled by selection of the orifice diameter and the over-all pressure drop across the stack, and there is a comparatively small amount of loss due to frictional resistance. In this application, operation is such that Reynold's number is kept in a range where there is little change in the orifice coefficient. As a result, there is also relatively little change in flow characteristics as a function of variations in viscosity. This configuration then permits one to design a quieting structure for valves having very large pressure differentials thereacross and in which variations in viscosity have comparatively little effect on the over-all flow characteristics. This is very useful since such changes are continually a factor to be dealt with because of temperature changes throughout the system.

It will be apparent to those skilled in the art that the computation of the number and size of orifices in series to effect the desired noise reduction is straightforward based on the understanding that the velocity across (or flow through) the individual orifices should not exceed values which will result in an excessive Reynold's number. Use of the dumbbell-shaped configuration of FIG. 4 does permit an additional orifice to be included in the plates 68a, as well as that of plate 70, so that the number of orifices in series is increased.

It will also be readily apparent that since the Reynold's number is a function of orifice diameter and fluid viscosity, certain adjustments of orifice diameter can be made to compensate for fluid viscosity changes throughout this series orifice flow path. This allows optimum use of space in a throttling valve, since each orifice can be tailored to provide a maximum pressure drop within the desired noise level.

In addition to the Reynold's number effect on noise resulting from a single orifice, orifices in series and paths in series or parallel, it has been determined that high frequency throttling noise, as when any defined flow path is only partially opened short metering length), can be controlled by regulating the throttling fluid velocity relative to the length of path opening. Therefore, given a fixed impedance flow path, throttling velocities into that path can be controlled by controlling the width of the entrance to that path. By providing quiet throttling in addition to quiet flow in the wide open path, high frequency noise (above approximately 3 $KH_z$) can be controlled. Noise in the lower frequencies can be controlled by limiting the nonmetering valve path velocities to very low values (approximately 15 to 20 feet per second or less), as is well known to those skilled in the art.

I claim:

1. A flow control device for installation in a fluid transfer system including a spool valve member controlling a flow of fluid under high pressure such that a potentially destructive or noise-generating fluid pressure differential exists;

a rigid structure surrounding said spool valve member comprising a series of stacked annular disks having abutting faces, some of said disks including a pattern of elongated slots therethrough defining areas of individual chambers and some of said disks having orifices therethrough of substantially smaller area than said slots, said slots and orifices alternating in pattern across said disks to produce a plurality of individual passageways across said structure, some of said disks having imperforate areas adjacent said slots to confine flow in defined streams in each of said passageways such that each such stream always changes direction to flow across the same orifice disk, movement of said spool valve serving to expose varying numbers of said disks to said flow of fluid.

2. In a flow control device for installation in a fluid transfer system including a spool valve member and a flow of fluid under high pressure such that a potentially destructive or noise-generating fluid pressure differential exists;

a rigid structure comprising a series of stacked laminar members having abutting faces adjacent said spool valve member, nonadjacent ones of which have a pattern of elongated passages therethrough defining areas of individual chambers and others of said members being interposed between pairs of said nonadjacent members and having a pattern of orifices providing communication between said passages, said passages and orifices alternating in patterns across said members to produce a large number of individual streams of fluid flowing across said structure, said orifices being of substantially smaller cross-sectional area than said passages such that the pressure drop across said structure is substantially that caused by the orificial losses across the orifices in series, and some of said laminar members providing walls confining groups of said individual streams such that each such stream always changes direction to flow across the same orifice member.

3. A flow control device as set forth in claim 2 wherein the number of series orifices and their effective areas are chosen such that the Reynold's number for any one of said orifices does not exceed a value equivalent to the desired noise level.

4. A flow control device as set forth in claim 2 wherein said rigid structure includes a series of stacked disks including a first group having a pattern of elongated slots therethrough, a second group interposed between pairs of said first group having orifices therethrough of substantially smaller area than said slots, and a third group of imperforate disks positioned on the opposite side of each of said pairs of said first group for confining flow in defined passageways formed between pairs of said imperforate disks.

5. A flow control device as set forth in claim 4 wherein said first group and said second group of members include indexing means to establish proper radial orientation of said members with respect to each other to assure that said passageways are continuous through said structure.

6. A flow control device as set forth in claim 5 wherein the numbers of series orifices and their effective areas are chosen such that the Reynold's number for any one of said orifices does not exceed a value equivalent to the desired noise level.

7. A valve comprising
a flow path including an entry opening to said flow path;
means for closing said opening in variable degree;
and means for quieting the flow through said opening comprising a stack of members across said opening having abutting faces, including a first group of said members having elongated passageways therethrough arranged in a series of patterns across the width of said members, a second group of said members wherein a single member is interposed between two members of said first group, members of said second group having a series of orifices therethrough substantially smaller than said elongated passageways, each of said two members having its passageways in registry with the orifices in said single member but offset with respect to each other, and
a third group of said members which are imperforate and which abut against the opposite faces of said first group of members to confine flow to a plurality of generally serpentine paths across said stack, said passageways defining chambers of cross-sectional area substantially exceeding the area of said orifices.

8. A flow control device for installation in a fluid transfer system including a spool valve member controlling a flow of fluid under high pressure such that a potentially destructive or noise-generating fluid pressure differential exists;
a rigid structure comprising a series of stacked disks having abutting faces including a first group having a pattern of elongated slots therethrough defining areas of individual chambers, a second group interposed between pairs of said first group having orifices therethrough of substantially smaller area than said slots and providing communication between said slots, said slots and orifices alternating in patterns across said disks to produce a plurality of individual passageways across said structure, and a third group of imperforate disks positioned on the opposite side of each of said pairs of said first group of disks for confining flow in defined streams flowing in said passageways formed between pairs of said imperforate disks such that each such stream always changes direction to flow across the same orifice disk,
movement of said spool valve member serving to expose varying numbers of said disks to said flow of fluid.

9. A valve comprising
a flow path including an entry opening to said flow path;
means for closing said opening in variable degree;
and means for quieting the flow through said opening comprising a stack of laminar members across said opening having abutting faces, including a first group of said members having elongated passageways therethrough arranged in a series of patterns, a second group of said members wherein a single member is interposed between two members of said first group, members of said second group having a series of orifices therethrough substantially smaller than said elongated passageways, each of said two members having its passageways in registry with the orifices in said single member but offset with respect to each other, and
some of said laminar members providing walls confining flow such that said flow always changes direction to flow across the same orifice member.

* * * * *